Nov. 8, 1955 L. W. CARVER ET AL 2,722,954
PORTABLE SAW MILL WITH BUILT-IN LEVELING MECHANISM
Filed Nov. 10, 1952 4 Sheets-Sheet 1
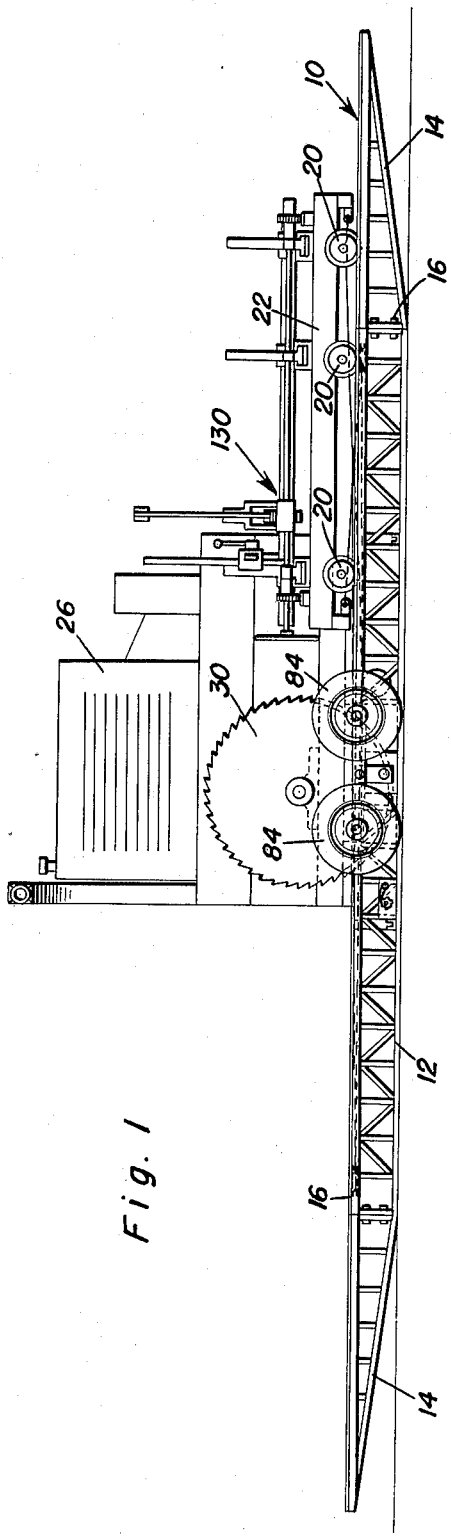
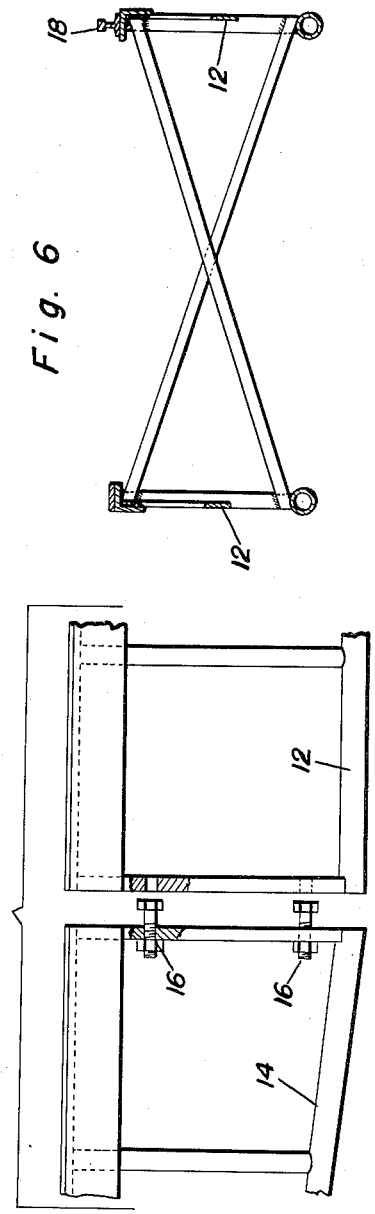
Lawrence W. Carver
Earl H. Christensen
INVENTORS Nov. 8, 1955 L. W. CARVER ET AL 2,722,954
PORTABLE SAW MILL WITH BUILT-IN LEVELING MECHANISM
Filed Nov. 10, 1952 4 Sheets-Sheet 2
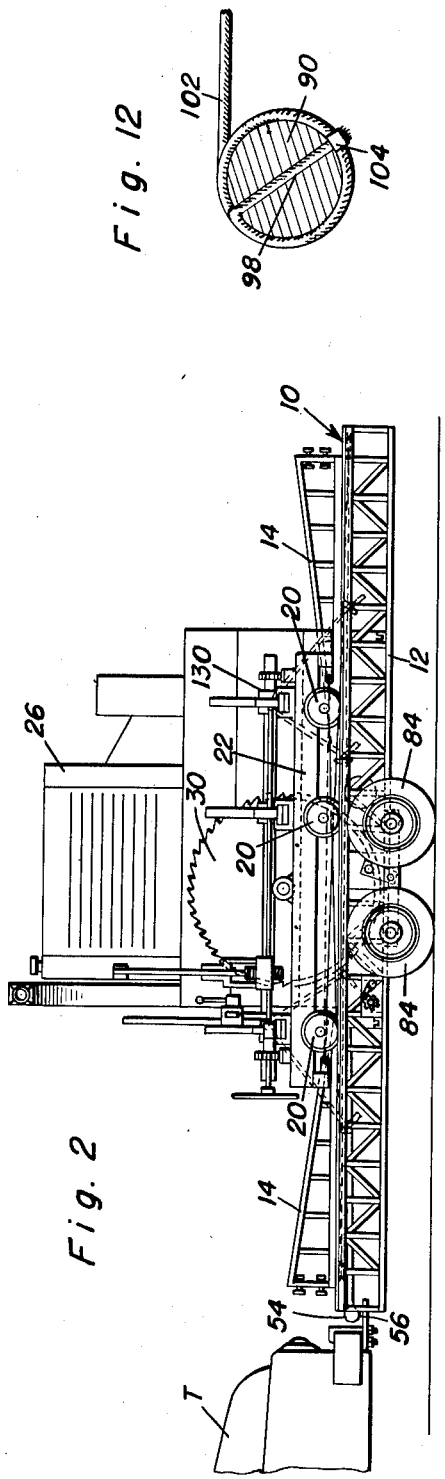
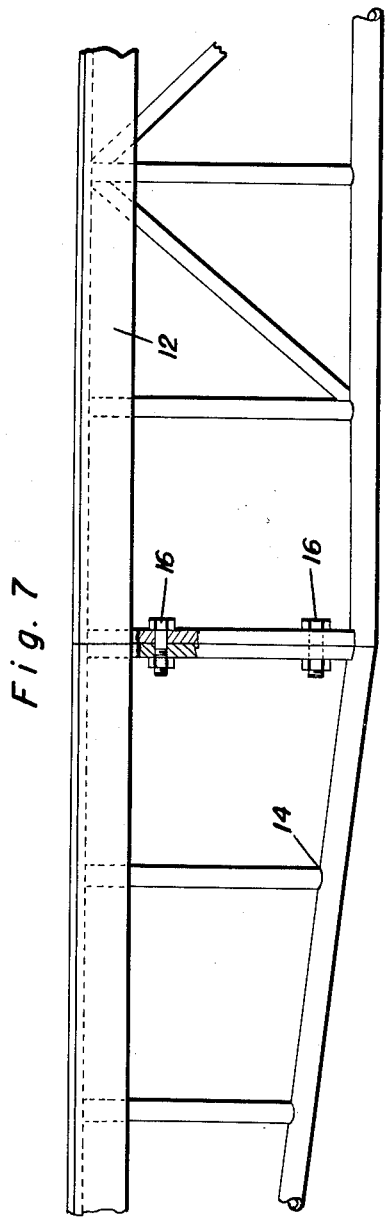
Lawrence W. Carver
Earl H. Christensen
INVENTORS

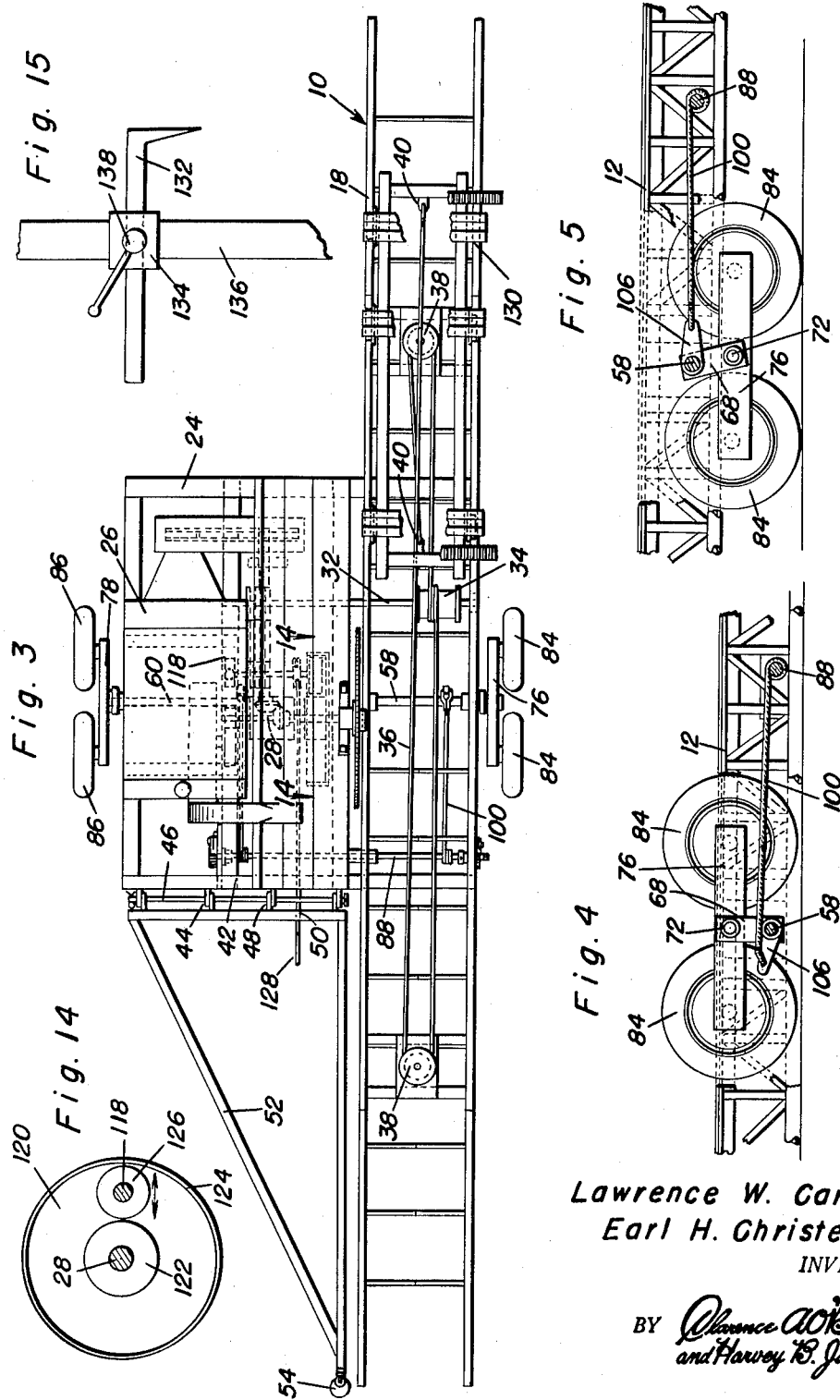

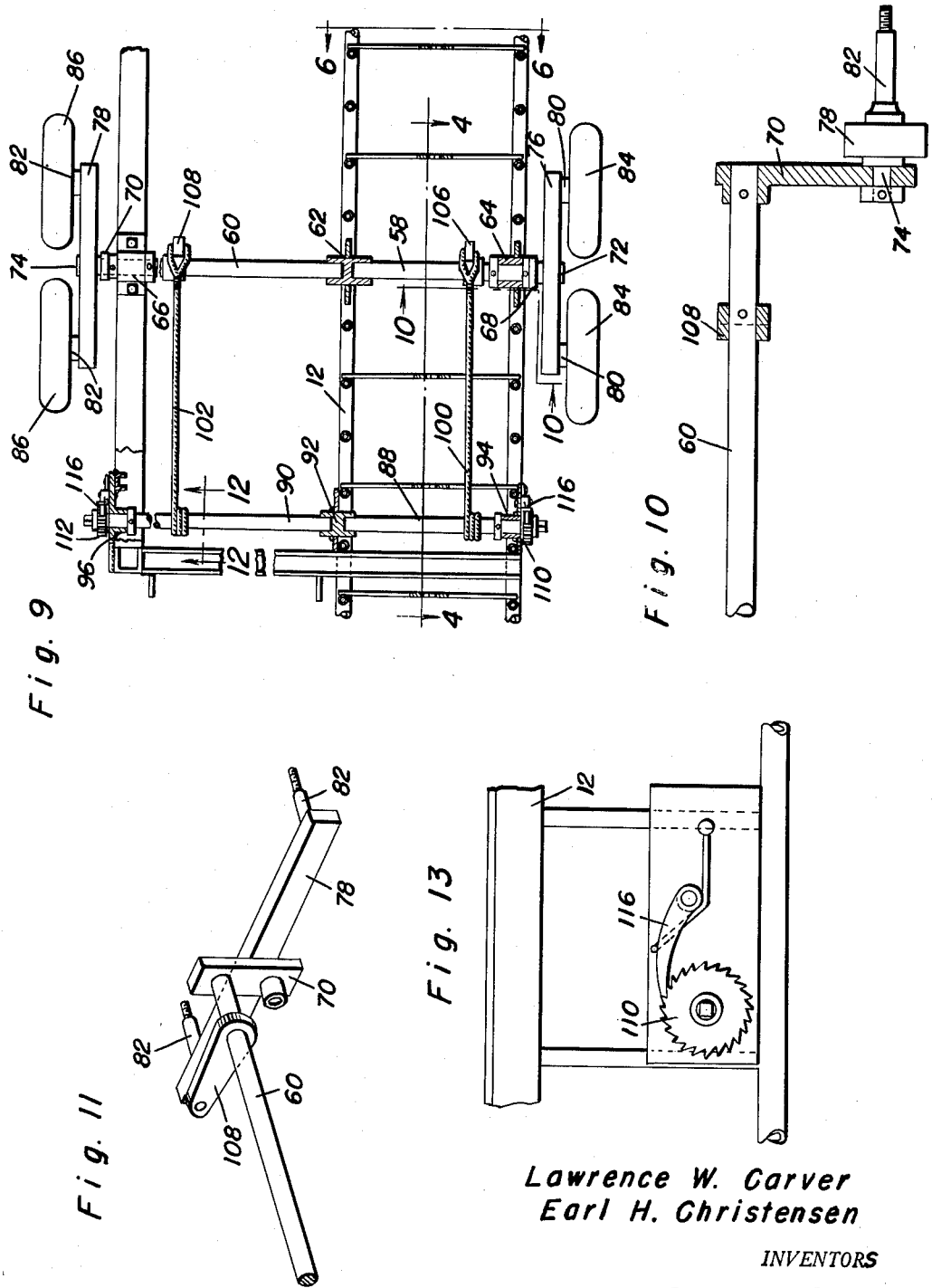

United States Patent Office 2,722,954
Patented Nov. 8, 1955

2,722,954

PORTABLE SAW MILL WITH BUILT-IN LEVELING MECHANISM

Lawrence W. Carver and Earl H. Christensen,
Park Rapids, Minn.

Application November 10, 1952, Serial No. 319,763

1 Claim. (Cl. 143—43)

This invention relates to new and useful improvements in the saw mills and the primary object of the present invention is to provide a portable saw mill composed of a track having three sections the end sections of which are removable from the central section for transporting the portable mill in a convenient manner.

Another very important object of the present invention is to provide a portable saw mill involving novel and improved wheel mounting means for the track whereby the track may be retained in a stationary position during use by a raising and lowering mechanism connected to the wheel mount.

A further object of the present invention is to provide a portable saw mill including a carriage supporting track, a pair of side wheels at each side of the track and novel and improved independently actuated means operatively connected to the wheels for selectively raising and lowering the wheels at one side independently of the wheels on the other side so that the track may remain in a level position although supported upon rough or irregular terrain.

A still further aim of the present invention is to provide a portable saw mill that is extremely strong and reliable in use, efficient and durable in operation, compact in structure, inexpensive to manufacture, assemble and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is a side elevational view of the present invention disposed in operative position;

Figure 2 is a side elevational view of the invention in position for hauling and illustrating the same coupled to a towing vehicle;

Figure 3 is a top plan view of Figure 1;

Figure 4 is a fragmentary longitudinal vertical sectional view taken substantially on the plane of section line 4—4 of Figure 9 and showing the track in a lowered position;

Figure 5 is a view similar to Figure 4 but showing the track raised;

Figure 6 (Sheet 1) is an enlarged transverse sectional view taken substantially on the plane of section line 6—6 of Figure 9 to show the guide track structure;

Figure 7 (Sheet 2) is an enlarged fragmentary side elevational view of the guide track and showing the manner in which the intermediate section is removably secure to one of the end sections;

Figure 8 (Sheet 1) is a group side elevational view similar to Figure 7 and showing the intermediate section separated from one of the end sections;

Figure 9 (Sheet 4) is an enlarged fragmentary view of Figure 3 and with parts broken away and shown in section;

Figure 10 is an enlarged vertical sectional view taken substantially on the plane of section line 10—10 of Figure 9;

Figure 11 is a fragmentary perspective view of line of the wheel mounting means;

Figure 12 (Sheet 2) is an enlarged transverse vertical sectional view taken substantially on the plane of section line 12—12 of Figure 9;

Figure 13 (Sheet 4) is an enlarged fragmentary view of Figure 2 showing the manner in which the raising rods are retained in selected rotated position;

Figure 14 (Sheet 3) is an enlarged vertical sectional view taken substantially on the plane of section line 14—14 of Figure 3; and, Figure 15 (Sheet 3) is an enlarged fragmentary elevational view of Figure 1 showing one of the log holding members used in the invention.

Referring now to the drawings in detail, wherein for the purpose of illustration, there is disclosed a preferred embodiment of the present invention, the numeral 10 represents a guide track that is composed of an intermediate section 12 and end sections 14. The ends of the intermediate section 12 are removably secured to the inner ends of the end sections 14 by fastening means 16, whereby the sections may be quickly and readily assembled or disassembled in a convenient manner. Each track section is composed of a pair of rigidly inter-connected side truss members having upper bars at least one of which supports a rail 18 (Figs. 3 and 6) upon which certain of the supporting wheels 20 of a carriage 22 ride.

A frame member 24 (Fig. 3) is rigidly attached to and projects laterally from the central portion of the intermediate section 12. This frame member, 24, supports a power plant 26. A cutter supporting shaft 28 is journaled in bearings on the frame member 24 and extends transversely of the track 10 and is operatably connected to the power plant to be driven thereby. A cutter 30 (Figs. 1 and 2) is attached to the forward end of the shaft 28 and parallels the guide track to cut timber or the like advanced by the carriage.

A second transverse shaft 32 is journaled for rotation in bearings that are carried by the frame 24 and the guide track 10. A cable drum 34 is keyed on shaft 32 and engages the central portion of cable 36 that is trained about pulleys 38 supported at the ends of the intermediate section 12. The ends of the cable 36 are attached to ears 40 at the end of the carriage. Shaft 32 is operatively connected to the shaft 28 by gearing so that the drum 34 will be rotated in order that the carriage may be reciprocated between the ends of the guide track. It is noted that suitable means is provided whereby the shaft 28 may be reversed so that after the carriage has been moved to one end of the track, it will then be moved to the other end of the track. A power plant is provided with a suitable clutch mechanism so that movement of the carriage and rotation of the cutter may be arrested at any desired phase of operation.

The forward end rail 42 of frame member 24 fixedly supports a group of ears 44 that accommodate a pin 46. Pin 46 also extends through ears 48 fixed to the shorter leg 50 of an open right triangular hitch frame 52. Hitch frame 52 supports a socket element 54 at its forward end that may be received over a hitched ball 56 on a towing vehicle T, whereby the device may be hauled to the desired location for use.

A pair of coaxial wheel mounting shafts 58 and 60 (Figs. 3 and 9) are supported on the track 10 and frame member 24. The inner adjacent ends of shafts 58, 60 are journaled in the end sockets of a bearing 62 fixed to the central part of guide track section 12 and the outer end portions of shafts 58 and 60 extend through bearing 64 and 66 attached to the track section 12 and frame member 24, respectively. Arms 68 and 70 are fixed to and project laterally from the outer ends of shafts 58 and 60. The outer ends of the arms 68 and 70 receive horizontal pins 72 and 74 that extend centrally through side members 76 and 78. Stub axles 80 and 82 are fixed to and project outwardly from the ends of the side members 76 and 78, and these axles carry preferably pneumatic ground wheels 84 and 86.

A pair of transversely extending coaxial rods 88 and 90 are rotatably supported by the track 10 and frame member 24 in front of and parallel to the shafts 58 and 60. The inner adjacent ends of rods 88 and 90 are received in the ends of a bearing 92 fixed to track section 12 and the outer end portions of rods 88 and 90 project outwardly through bearings 94 and 96 fixed to section 12 and frame member 24, respectively.

Rods 88 and 90 are formed with transverse apertures 98 (Fig. 12) that receive the forward ends of cables 100 and 102, and rings 104 at the forward extremities of the cables 100 and 102 retain the cables engaged with the rods 88, 90 and within the apertures 98. The rear ends of the cables 100 and 102 are formed with loops that are engaged through apertures in the outer ends of crank arms 106 and 108 (Figs. 9 and 10) fixed to the shafts 58 and 60.

Ratchets 110 and 112 are fixed to the outer ends of rods 88 and 90 for engagement with spring urged dogs 114 and 116 mounted on the section 12 and the frame member 24, respectively. The outer ends of the rods 88 and 90 are multi-sided to accommodate the sockets of crank handles (not shown), whereby the rods 88 and 90 may be individually rotated to impart independent rotation to the shafts 58 and 60 for the purpose of raising and lowering the side members 76 and 78 and the wheels carried thereby. In this manner, the track 10 may be retained level and/or stationary regardless as to the irregular terrain on which the device is support. It will be noted that, as shown in Figures 4 and 5, the crank arms 106, 108 are rotatable through an arc of substantially 180° by pull on the cables 100, 102 to correspondingly rotate the shafts 58, 60 and the arms 68, 70 so that the side members 76, 78 may be adjusted upwardly a substantial distance in leveling operations to correspondingly adjust the wheels 84, 86.

The movement of the carriage from right to left or left to right is accomplished by a horizontally swingable shaft 118 that supports pulleys that are connected to pulleys on shaft 32 by endless pulley belts. Shaft 28 fixedly supports a cup shaped member 120 having a hub 122 and a peripheral cylindrical wall 124. Shaft 118 fixedly carries a roller 126 for selectively engaging hub 122 or wall 124 depending upon which direction the carriage is to be moved.

A suitable linkage including a lever 128 is attached to the shaft 118 for swinging the shaft 118 so that it will engage either hub 122 or wall 124.

Carriage 22 is provided with suitable means for clampingly supporting logs that are to be cut by the blade 30. This log holding means, being of conventional form for saw mills, is designated generally by the numeral 130 and includes a holddown dog 132 having a supporting collar 134 that is adjustable on a supporting post 136 by a set screw 138.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

Leveling means for a saw mill of the type having a log carriage supporting track and a saw supporting platform attached to and extending laterally and centrally from said track comprising first and second coaxial shafts, means rotatably mounting said first shaft on said track, means rotatably mounting said second shaft on said track and platform, a laterally projecting crank arm on the outer end of each shaft, a pair of elongated side wheel supported members pivoted centrally on said crank arms respectively, for upward adjustment by rotation of said coaxial shafts and crank arms, a second crank arm on each shaft, and means operatively connected to the second crank arms for rotating said shafts together with the first named crank arms independently substantially 180° to adjust said side members a substantial distance in leveling operations to correspondingly adjust said wheels, said last means comprising a pair of first and second coaxial rods, means rotatably mounting the first rod on the track, means rotatably mounting the second rod on the track and platform, and a wind-up cable operatively connecting each rod to one of said second named crank arms.

References Cited in the file of this patent

UNITED STATES PATENTS

| 331,653 | Richey | Dec. 1, 1885 |
|---|---|---|
| 695,194 | Carney | Mar. 11, 1902 |
| 980,439 | Risner | Jan. 3, 1911 |
| 1,603,821 | Watters | Oct. 19, 1926 |
| 1,791,406 | Foreman et al. | Feb. 3, 1931 |
| 1,984,492 | Peace | Dec. 18, 1934 |
| 2,459,800 | Esgate | Jan. 25, 1949 |
| 2,612,913 | Bach | Oct. 7, 1952 |
| 2,621,055 | O'Kelley | Dec. 9, 1952 |
| 2,687,309 | Anders | Aug. 24, 1954 |